Feb. 20, 1934.   J. DE LA CIERVA   1,948,456
AIRCRAFT WITH ROTATIVE SUSTAINING BLADES
Filed Nov. 20, 1930   7 Sheets-Sheet 1

INVENTOR
Juan de la Cierva
BY
ATTORNEYS

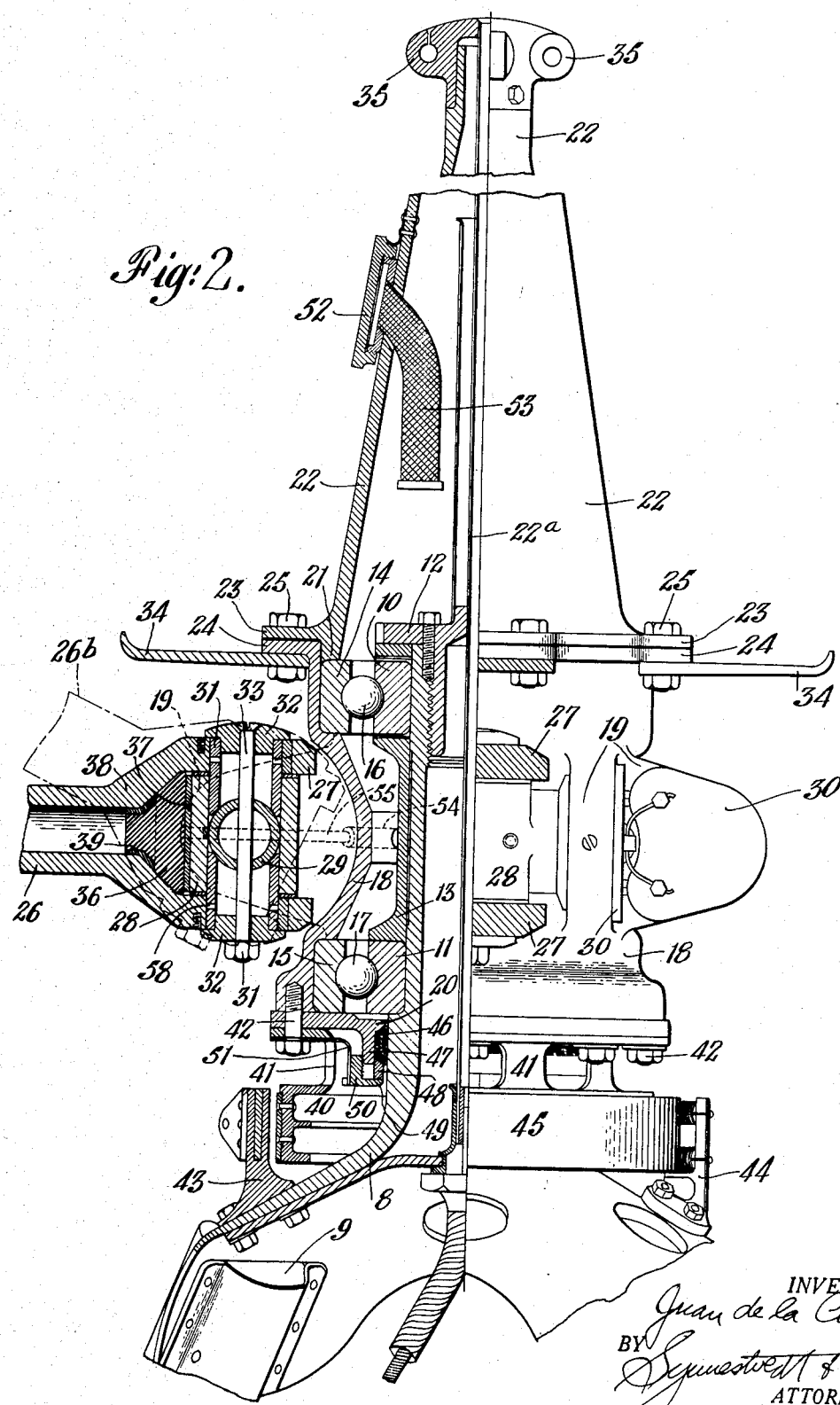

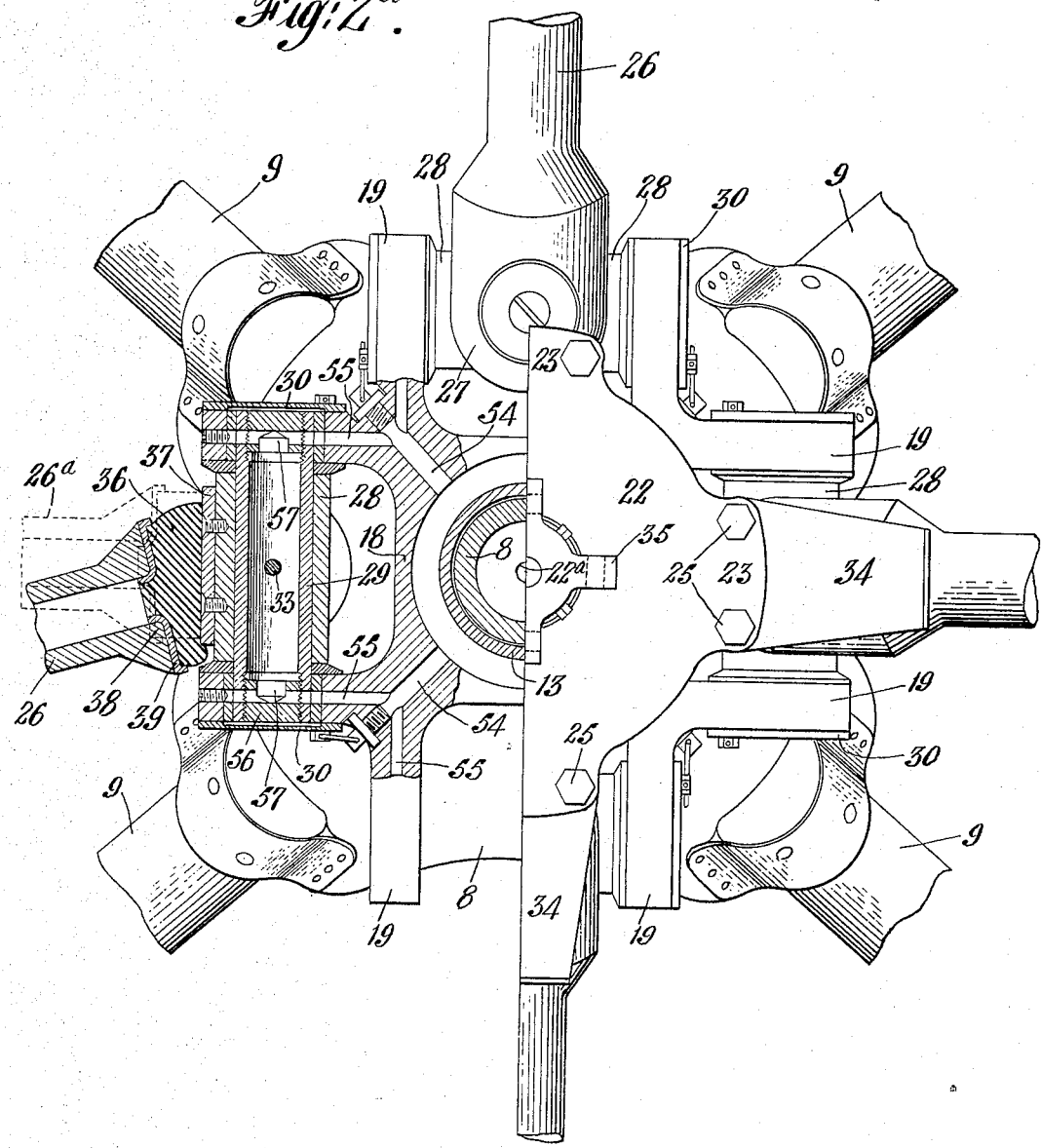

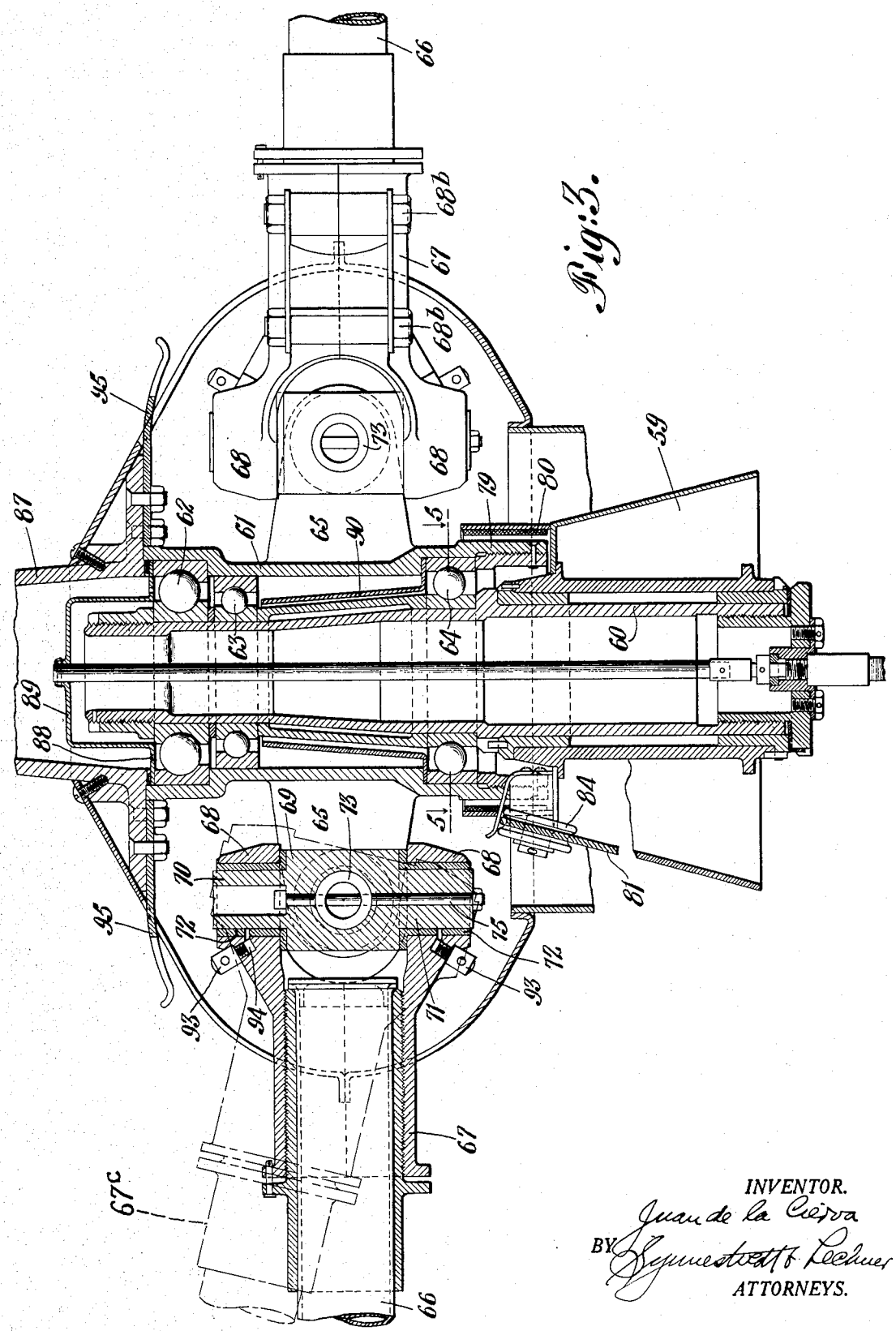

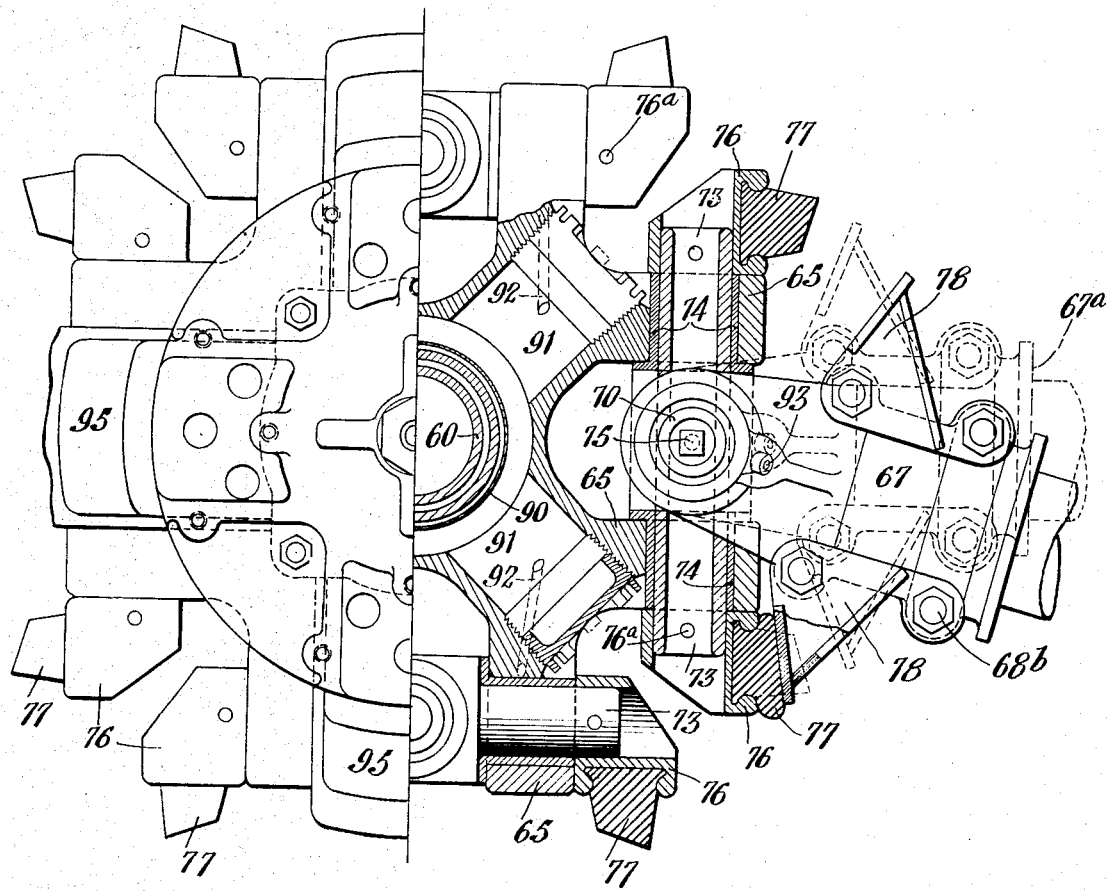

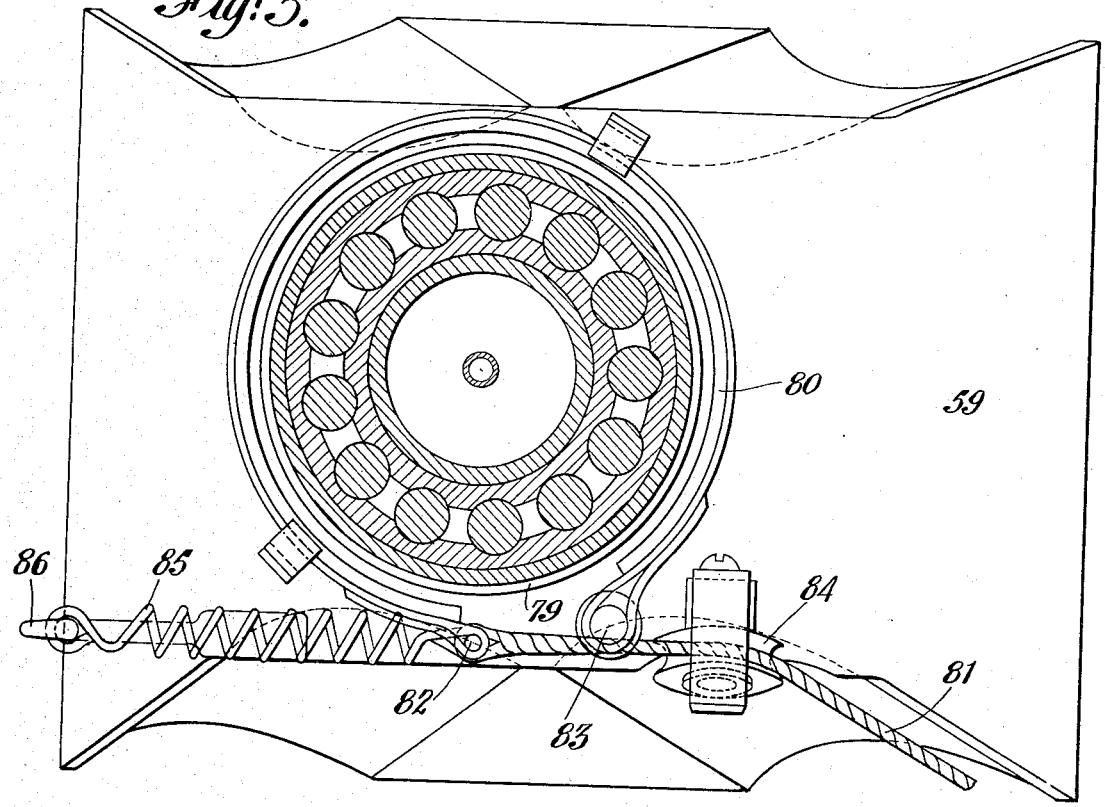
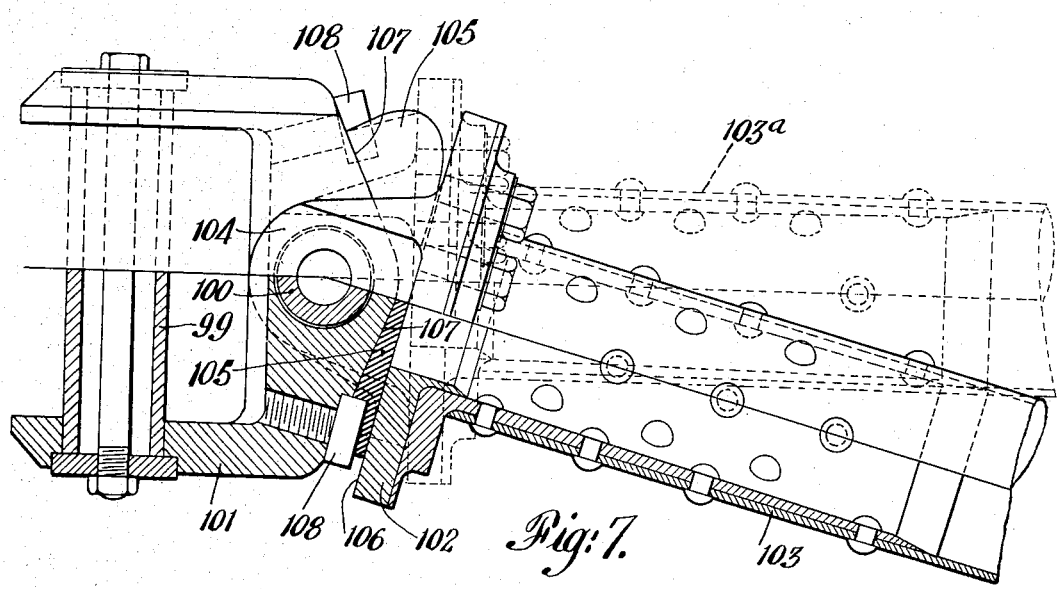

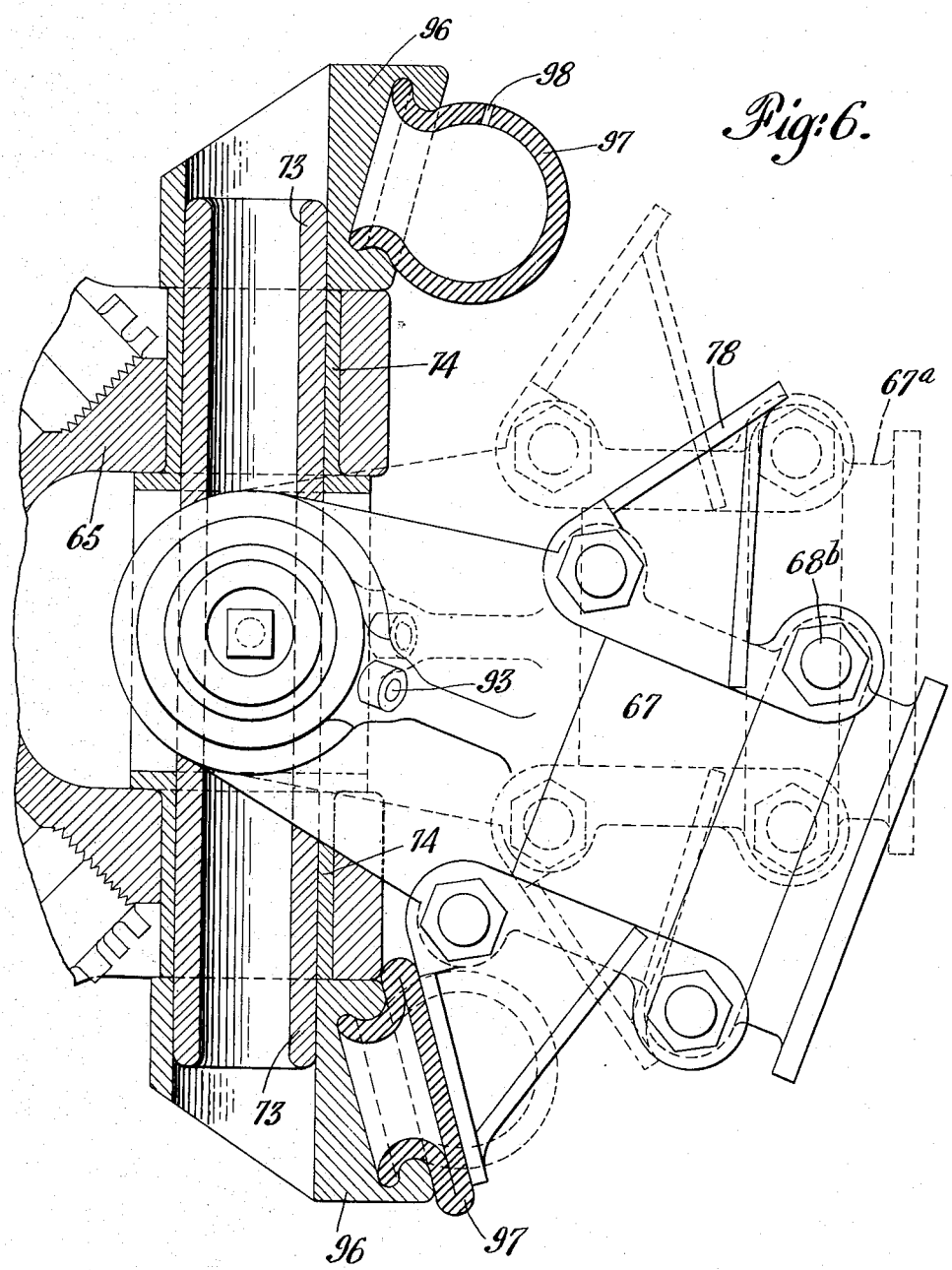

Patented Feb. 20, 1934

1,948,456

UNITED STATES PATENT OFFICE 1,948,456

AIRCRAFT WITH ROTATIVE SUSTAINING BLADES

Juan de la Cierva, Madrid, Spain, assignor to Autogiro Company of America, Philadelphia, Pa., a corporation of Delaware Application November 20, 1930
Serial No. 496,872

47 Claims. (Cl. 244—19)

This invention relates to aircraft with rotative sustaining blades and is particularly concerned with the rotor construction of that type of craft wherein the set of rotatably mounted sustaining blades, or wing system, is actuated, during operation of the machine, by relative air-flow such as results from relative movement of the craft and the atmosphere.

The type of craft particularly referred to above generally includes a set of sustaining blades or wings which are mounted on a supporting structure to revolve about a common substantially vertically disposed axis, the blade system being located above the body or fuselage of the craft. In addition, it should be noted that each individual blade is preferably provided with articulated or pivoted joints, spaced from the center of rotation thereof, in order that the blades may be free, independently, to assume various positions under the influence of centrifugal, lift, drag and anti-drag, and other forces to which they are subjected during operation. Additionally, the blades may be made flexible to assist in compensating for variations in the lift and centrifugal forces which are applied thereto.

The present invention deals particularly with the construction and operation of sustaining blades of the type referred to, the same being capable of individual displacement, in order to compensate for the different forces applied thereto and the variations thereof incident to the rotation of the blade system about its axis. At this point, it is to be observed that the present invention is especially useful in connection with rotor construction having blades which are pivoted or articulated as above noted and which, therefore, comprises a plurality of blades or wings which are joined together to provide the desired pivotal movement relative to each other and to the machine.

In general, it is the object of the present invention to improve the operation of rotatably mounted sustaining blades by providing for the smoothest possible running thereof as well as maximum strength, flexibility and control under various flying conditions as well as in landing and taking off.

More specifically, the present invention contemplates the use of means for cushioning various relative movements of the blades and blade mounting parts and the provision of means for braking the rotary movement of the blade system. In addition, it should be noted that the combination of the cushioning means and the brake mechanism referred to, as well as the combination of the cushioning means and a rotor starting device, results in still further advantages, all of which will be considered more fully hereinafter.

How the foregoing objects and advantages, together with others which will occur to those skilled in the art, are obtained will be apparent from a consideration of the following description taken with the accompanying drawings which illustrate several embodiments of the invention.

Of the drawings:—

Figure 2 is an enlarged side view, partly in section and partly in elevation, of a part of the supporting structure for the rotatably mounted blade or wing system of the craft illustrated in Figure 1, portions of the blade stubs mounted thereon being included and certain parts being broken away or omitted for the sake of clarity.

Figure 2a is a top view of the structure illustrated in Figure 3, this figure also including portions in section, in elevation and broken away or omitted to disclose parts lying therebeneath.

Figure 3 is a view similar to Figure 2 but illustrating a modified form of supporting structure and the invention applied thereto, the same being shown in vertical section with the hub or base end of one of the blades shown in elevation.

Figure 4 is a top view partly in section and partly in elevation of the structure illustrated in Figure 3.

Figure 5 is a sectional view, particularly illustrating the brake mechanism associated with the structure of Figures 3 and 4, this view being taken substantially on the line 5—5 of Figure 3.

Figure 6 is an enlarged fragmentary view similar to Figure 4 illustrating a modified form of the invention as applied to a rotor head construction of the character shown in Figure 4; and Figure 7 is a view, partly in section and partly in elevation of a portion of the hub end of a blade structure which includes still further modifications.

Figure 1:
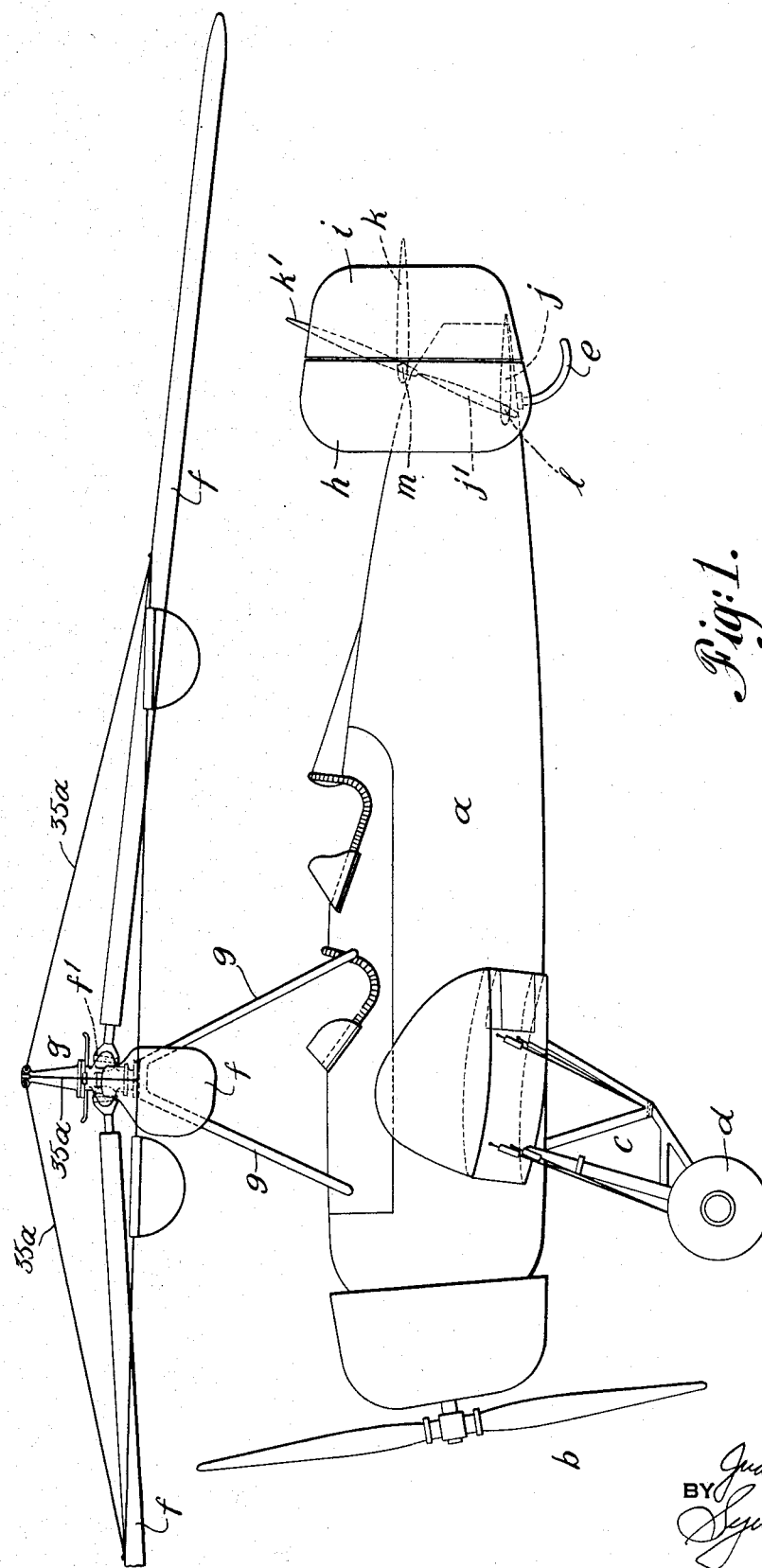
Figure 1 is a side view of an aircraft of the type referred to embodying the improvements of the present invention.

Referring first to Figure 1, the fuselage of the aircraft is indicated by the letter $a$ at the forward end of which is a propeller $b$ which may be driven by any suitable motor means (not shown). The craft is also provided with an undercarriage $c$, wheels $d$ and a tail support or skid e. Above the fuselage is arranged the sustaining blade or wing system, in this instance comprising a set of four blades f which are articulated, for example, as indicated at f', to the rotor head construction indicated in general by the reference letter g. In addition the craft is provided with vertically disposed tail surfaces h, rudder elements i and stabilizer and elevator surfaces indicated at j and k, respectively, which are pivotally mounted at l and m in order that they may be angled upwardly as indicated at j' and k'. The purpose of providing for angling of these tail surfaces is to deflect slip-stream from the propelling means upwardly against the blades f and thus initiate rotation thereof prior to taking off or rising from the ground. This type of tail structure is illustrated in my copending application Ser. No. 432,773, filed March 3rd, 1930, and, per se, forms no part of the present invention. However, it is illustrated herein in order to bring out its cooperative relation with other parts of structure which will be considered more fully herebelow.

By reference now to the embodiment of the rotor head construction applied to the craft of Figure 1 and illustrated in detail in Figures 2 and 2a, it will be seen that the structure includes an upright member or standard 8, the upper portion of which is substantially cylindrical and the lower portion of which is flared or enlarged in order to form a pylon apex to provide for the attachment thereof to pylon struts or legs, fragments of which are indicated at 9 in Figures 2 and 2a, the said legs serving to support the member 8 on the fuselage or body of the aircraft as clearly shown in Figure 1. The upper cylindrical portion of the member 8 serves as a support for the ball bearing races 10 and 11 which are vertically spaced from each other and secured thereto by means of the retaining collar or ring 12, a spacing member 13 being interposed between the races 10 and 11. Complementary ball races 14 and 15 cooperate with the balls 16 and 17 and the races 10 and 11 to complete two separate and spaced bearings. The outer ball races 14 and 15 are mounted and secured in a hub member 18 having pairs of apertured lugs 19 to which the blades of the wing or blade system are secured. A flat ring 20 serves to secure the lower ball race 15 in the lower end of the hub member 18 and a downwardly projecting shoulder 21 at the lower edge of the cone or tip 22 serves to secure the upper race 14 in its operative position within the hub element 18, the cone 22 being secured to the hub as by means of the flanges 23 and 24 and bolts 25.

According to the embodiment of the invention illustrated in Figures 2 and 2a, the inner ends of the blades (indicated at 26) are secured to the hub member 18 in the following manner. Each blade member 26 is provided with apertured and opposed forks 27, 27, between which the hollow joint member 28 is positioned. This joint member, in general configuration, resembles a four-way pipe connection, the openings therein being arranged in pairs, with the openings of each pair cylindrical in configuration and formed in the joint member on a common axis. A hollow pivot pin 29 extends all the way through the openings of one of the pairs provided in the joint member 28 and projects at each end thereof into the apertures formed in the lugs 19 of the hub member 8. Cap members 30 secured to the lugs 19 serve to cover the apertures through which the pin is inserted. The apertures in the forks 27 are arranged in alignment with the other pair of openings in the joint member 28 and a pair of relatively short and hollow pivot pins 31 are inserted through the apertures in the forks 27 and into the aligned openings in the joint body, the hollow pins or sleeves 31 preferably being of size and shape suitable to extend from the outer face of the forks 27 inwardly to the pin 29 of the other pivot. Cap members 32 and a bolt 33 serve to secure the pins 31 and 29 in operative position.

The joint construction described, therefore, provides for two different and separate pivot axes intersecting each other at right angles on which the blade mounting part 26 may be moved, vertical angling of the blade part 26 being indicated at 26b in Figure 2 and horizontal angling thereof being indicated at 26a in Figure 2a. These dual articulated joints with intersecting pivot axes are advantageous in producing a simple, rugged and compact rotor construction, the same resulting in reduction of head resistance and parasite drag to a minimum.

While this form of articulated mounting is an improvement over that shown in my copending application Serial No. 145,655, filed November 1, 1926 and issued on May 24th, 1932, as Patent 1,859,584, the purposes of the dual pivoted movement are the same as those described in said patent, in which there is a full disclosure of the rotor and blade action.

With this dual or double pivotal movement the blades of the wing system are free, independently, to assume various positions under the influence of different forces which are applied thereto at various points in the revolution of the wing system. In order to prevent excessive or abnormal upward movements of the blades on the horizontally disposed pivot axes, as by gusts of wind when the rotor is at rest and consequently not acted upon by centrifugal force, flexible stop members 34 are secured to the hub member in positions overlying the hub ends of the blades. It should also be noted that the support of the blades when they are inactive or at rest is provided for by means of cables or supporting wires 35a (see Fig. 1) which are preferably attached to the blades at points substantially spaced from the hub, the other ends of the supporting wires being extended upwardly and radially inwardly to the apertured lugs 35 which are carried by the cone or tip member 22. It is to be understood, however, that the supporting wires perform no function during operation of the aircraft. The blades are maintained in their proper operative position during flight by virtue of the centrifugal, as well as other forces to which they are subjected. During normal operation, therefore, the blades automatically assume the normal flight position and the supporting wires or cables 35a become slackened so that they do not interfere in any way with the free movements of the blades on the pivot axes provided in the joint member 28.

At this point it should be noted that the movement of each sustaining blade in its general path of rotation and the forward travel of the aircraft thru the air results in movements of the blade on its vertically disposed axis, the movements varying in amplitude and direction at various points in each complete revolution of the wing system. It has been found to be desirable to yieldingly restrain or at least cushion these movements of the blades in the general path of travel thereof. To this end the embodiment of the invention illustrated particularly in Figures 2 and 2a includes a resilient block 36, preferably made of rubber, positioned between a flat plate 37 which is secured to the joint member 28 and the crotch or base portion 38 of the forked end of each blade 26. A suitable cap member 39 may be interposed between the base 38 and the block 36. From inspection of Figure 2a, it will be seen that as each blade 26 pivots about the vertically disposed axis in the joint 28, the rubber block 36 associated therewith is compressed at one side or the other in such manner as to resist and cushion the pivotal movement. In the figure just referred to, the full line showing of the blade member 26 at the left illustrates an angled or flexed position while the dotted line showing 26a illustrates the blade in normal and radial position. It should also be noted in connection with this figure that the rubber block 36 according to this embodiment of the invention is configured and arranged in such manner as to remain under compression between the parts 38 and 37 in all positions which the blade may occupy in movements on its vertical pivot axis. The block 36, therefore, serves to cushion movements of the blade with which it is associated and, in addition, has a tendency to maintain the blade in its normal or radial position. Furthermore, with the resilient members arranged to be under compression at all times, the resistance to movement of a blade begins simultaneously with such movement and increases gradually and substantially uniformly as the blade is displaced farther from its normal position, so that no shocks or sudden strains are imposed on any of the parts.

This arrangement of the resilient cushion and its location adjacent the center of angling has this important advantage, to wit: that while its effect upon normal articulative movements of the blade, in flight, is small (it being understood that such movements are desirably substantially unrestrained), yet movement of the blades from normal mid-position when at rest, i. e., when they are not under the influence of flight forces, and excessive movements when in action, are substantially restricted. This important advantage will be further considered hereinafter.

By reference again to Figure 2, it will be seen that the mechanism disclosed therein includes a brake drum 40 carried by the hub member 18, supporting members 41 and bolts 42 being provided for this purpose. Suitable standards, such as those indicated at 43 and 44 in Figure 2, serve to support a brake band 45 on the stationary structure 8. This braking mechanism may be employed whenever it is desired to reduce the speed of rotation of the wing system, as, for example, to bring said system to rest immediately after the craft has landed on the ground. In this connection it should be noted that the vertical pivot permits the blade to lead or lag when the brake is applied, thus relieving the parts of severe bending stresses, and that the rubber blocks 36 are useful in restraining and cushioning movement of the blades on the vertically disposed axes when the brake is being employed. Shocks and strains on various parts of the wing system, therefore, are reduced to a minimum. In like manner, when initiating rotation of the blade system preparatory to taking off, as, for example, by the mechanical starting device of my Patent No. 1,692,082, issued November 20, 1928 or by the slip-stream starting device disclosed and described in detail in my copending application, Serial No. 352,554, filed April 4, 1929 and issued May 10th, 1932, as Patent 1,857,807, or as illustrated in Figure 1 of the drawings herein, the resilient stop devices are very advantageous in preventing excessive blade movements as well as shocks to the blade and rotor head parts. In addition, I have found that the resilient stops serve a special function in obtaining initial rotative movement where an air-flow starting device is used as such a device is shown by experiments to be much more effective when the blades are maintained, at start, in substantially rigid radial positions.

The tubular construction of the spindle member 8 not only serves to obtain light weight, but also co-operates with the tubular hub member 18 and cone or tip 22 to provide a central cavity through which the rotor tachometer drive 22a may be carried directly downwardly to the fuselage, without the necessity for external, exposed gearing such as employed in the construction illustrated in my copending application Serial No. 498,299, filed November 26th, 1930, and issued November 28th, 1933, as Patent 1,936,752, thus simplifying the construction, protecting the mechanism, cutting down air resistance, and producing a more streamlined rotor in general.

In order to provide for the lubrication of the main bearings within the rotor hub 18 as well as the bearing surfaces of the articulated joints in the blades, I have arranged the upright standard 8, the hub member 18 and the cone 22 in such manner as to form a reservoir adapted to carry a supply of lubricant. In order to prevent leakage and loss of the lubricant from the interior of the cone 22 and the hub member 18, I have arranged a suitable packing 46 between a downwardly extending flange 47 on the member 20 and the exterior surface of the cylindrical portion of the main supporting structure 8. This packing may be tightened in position by means of a ring 48 which is supported by the internal flange 49 of the member 50. The member 50 is cylindrical in configuration and is threaded onto the outer surface of the depending flange 47. A spring clip 51 may be employed in order to prevent loosening of the ring or nut 50. Means in the nature of a removable cap 52 and a strainer 53, are provided in the cone 22 in order to permit a supply of lubricant to be poured or delivered into the chamber formed within the general assembly. Preferably, the amount of lubricant maintained in the chamber is sufficient to cover both of the main bearings therein. These main bearings, therefore, always run in lubricant.

Distribution of the lubricant from the central casing to the pivot bearing surfaces of the individual blades is provided thru passages 54 extending radially outwardly through the member 18. From the passage 54 the lubricant is conducted through additional passages 55 formed in the lugs 19 to the interior of the hollow pins 29. The plugs 56 which close the ends of the hollow pins 29 are suitably bored or drilled, as indicated at 57 in order to permit the passage of lubricant from the passages 55 into the pins 29. In this way lubricant is constantly supplied to the relatively moving surfaces of the pins 29 and the lugs 19, it being noted that the passages 55 open directly through the bearing surfaces provided in the lugs 19.

From the interior of the pins 29, the lubricant is free to flow through the openings through which the pins or bolts 33 extend, the fit of the said bolts being sufficiently loose to permit this passage of lubricant into the interior of the vertically disposed hollow pins 31. The relatively moving surfaces of the apertured forks 27 and the pins 31 receive the lubricant from the interior of the pins through openings or ports 58 which overlie the bearing surfaces in the forks 27. According to this embodiment of the invention, therefore, lubrication of all of the working parts of the entire blade system including the main or hub bearings is taken care of by a single reservoir or source of supply, the application or feed of the lubricant to the various parts being of such character that the necessity of employing circulating pumps or the like is completely eliminated. In this connection it should be noted that the dual pivot construction having the two pivot axes intersecting each other greatly assists in effecting this desirable type of lubrication.

The embodiment of the invention illustrated in Figures 3, 4 and 5 includes a supporting structure or box 59 (see Figures 3 and 5) which is adapted to be supported above the fuselage of the craft in a manner similar to that explained in connection with Figures 1, 2 and 2a. The structure of these figures also includes an upright stationary part or standard 60 around which the hub member 61 is mounted for rotary movement, bearings 62, 63 and 64 being interposed between the members 60 and 61 in a manner similar to the embodiment of the invention first described. In this case also the hub member 61 carries apertured lugs 65 which are arranged in pairs in order to provide the bearings for pivotal movement of the blades attached thereto on horizontal axes.

In this case the blade shaft 66 terminates and is secured in a split socket member 67, the parts of which are secured together by bolts 68b, the complete blade socket being forked as indicated at 68, 68, the forks being apertured in order to provide bearing surfaces for the pivot on a substantially vertically disposed axis.

In this embodiment of the invention the joint construction includes a pin member 69 having bearing portions 70 and 71 of reduced cross section extending outwardly therefrom into the apertures of the forks 68. Bearing liners 72 may be interposed between the elements 68 and 70 and 68 and 71. The horizontal pivotal movement is provided by means of a hollow pin 73 extending through the member 69 at right angles to the axis of the bearing portions 70 and 71 thereof. This pin 73 is of length sufficient to extend into and through the apertures in the lugs 65 at each side of the vertical pivot pin 69. Bearing liners 74 may be interposed between the members 65 and 73. A pin or bolt 75 passing axially through the member 69 and transversely through the pin 73 serves to secure these parts together. The blade is illustrated in an upwardly angled position in dotted lines in Figure 3 (see reference character 67c).

At the outer face of the lugs 65 of each pair, the pin 73 carries a stop member 76, secured as by a bolt or rivet 76a, and each one of the stop members, in turn, carries a rubber block 77 facing outwardly in the general direction of the blade extension. Each blade socket member 67 carries a pair of members 78, which may be mounted on the bolts 68b heretofore referred to, and which are positioned and arranged to contact with the rubber blocks 77 when the blade turns on the substantially vertically disposed pivot 69. The pin members 73 on which the stops are mounted are so arranged that other forms of stops may conveniently be substituted or mounted thereon, as illustrated in Figure 6 hereinbelow described. It will be seen that as a blade moves on its horizontal pivot, the cushions and stops move therewith so as to be always in position to control movement of the blade on its vertical pivot.

Unlike the structure illustrated in detail in Figures 2 and 2a, the rubber blocks 77 serve only to cushion abnormal movements of the blades at the right of (see full line showing of blade 67 at the right of (see full line showing of blade 67 in the central Figure 4). It will be noted that in the central or radial position of the blade (see dotted line showing 67a in Figure 4) both of the stop members 78 are spaced from their associated rubber blocks 77 so that a limited amount of pivotal movement on the vertically disposed axis may occur before the blocks 77 act to cushion or resist the movement. With reference to this construction, it should be understood that, if desired, additional control over the normal interspacing between the several blades of the rotor may be obtained by employing the usual interblade connections, such as shown in my Patent No. 1,859,584 hereinbefore referred to.

This embodiment of the invention also includes a brake mechanism for the hub 61 of the blade system. In this case, however, the brake drum 79 is formed integral with the hub member 61 and the cooperating brake band 80 is mounted on the stationary box or supporting structure 59. As appears most clearly in Figure 5, the operating mechanism for the brake includes a cable 81 which is secured to one end of the band 80 (see connection at 82). The other end of the brake band 80 is rigidly and stationarily secured to the support 59 as by means of a stud or pin 83. In addition the cable 81 preferably passes over a pulley or guide roll 84 suitably mounted on the structure 59 so that a downward pull on the cable 81 produces a transverse pull on the free or movable end of the brake band 80. The cable 81, of course, extends thru suitable guide means (not shown) into the cockpit of the craft in order to permit actuation of the brake by the operating pilot. The brake is released and held in inoperative position by means of a tension spring 85 secured to the brake band at 82 and also to a stationary part 86.

In this embodiment, the brake, of course, performs the same function as the brake of the rotor structure first described. It should be noted, however, that the rubber stops 77 here employed serve only to cushion abnormal movements of the blades on the substantially vertically disposed pivot axis, as would occur, for example, when applying the brake to arrest the rotary movement of the wing system or when initiating rotation thereof prior to take-off. These rubber stops, therefore, do not restrain slight blade movements during flight, but, of course, would come into operation to cushion any excessive movements which may occur during operation as well as when using the brake or when starting.

Lubrication of the main bearings 62, 63 and 64 in this instance is also preferably provided by the introduction of lubricant into the tip or cone member 87 (see Figure 3) which extends above and is secured to the hub member 61. The lubricant may pass from the cone 87 through apertures 88 in the cap member 89 and to the operating surfaces of the three main bearings which, as will be seen from inspection of Figure 3, are disposed vertically above each other. A shield or baffle element 90 positioned within the hub 61 and secured thereto at its lower edge serves to form a reservoir or supply chamber for lubricant to be distributed to bearing surfaces in the articulations of the blades. From inspection of Figure 4 it will be seen that the chamber provided between the element 90 and the hub 61 is enlarged in the hub as indicated at 91 into a plurality of cavities. Distributing holes or passages 92 extend from the cavities 91 to the bearing surfaces provided in the apertures of the lugs 65. Lubrication of the vertical pivot is preferably provided by means of lubricant gun connections such as indicated at 93, passages 94 extending therefrom to the bearing surfaces of the studs 70 and 71 and the cooperating inner surfaces of the bearing liners 72.

By reference to Figures 3 and 4, it will also be seen that stop members 95 are arranged to overlie the blade sockets 67 and thus limit the upward movement thereof on the horizontal pins 73. It is also to be understood that suitable supporting cables secured to the top of the cone 87 are provided in this form of the invention, the tachometer drive being also conveniently mounted within the hollow axis of rotation.

The form of the invention illustrated in Figure 6 is substantially identical with that shown in Figures 3 and 4, it being understood that Figure 6 is a fragmentary view illustrating a blade socket member 67 and its connection to the hub member 65. The modification illustrated in this figure involves a change in the form of cushioning element employed. In this case, stop members 96 are secured to and carried by the pin 73. The resilient elements here employed take the form of hollow air cells 97, preferably made of rubber and preferably provided with relatively small exhaust apertures 98. The operation of this modification is, of course, similar to that described above, but it should be noted that the hollow stop members employed produce a pneumatic cushioning action and that they may be designed to give a more extended cushioning action.

The form of the invention illustrated in Figure 7 is similar in certain respects, to that illustrated in Figures 1, 2 and 2a. However, in Figure 7 the horizontal pivot 99 is spaced from the vertically disposed pivot 100, a forked joint member 101 being employed to connect the two pivots. The pivot pin 100 in this case extends thru the yoke or forked member 101 and projects at each side thereof. The hub end portion 102 which is secured to the blade element 103 carries spaced and opposed lugs 104 which engage the central portion of the yoke 101. In addition, the lugs 104 are apertured to receive the pivot pin 100 and thus provide the pivotal movement of the blade on a substantially vertically disposed axis.

In this last form of the invention the resilient stop means employed takes the form of a single rubber block 105 which is positioned between the rear or back face 106 of the blade part 102 and the forwardly converging surfaces 107 of the joint yoke 101. Bolts 108 may be employed in order to prevent displacement of the block 105 from its normal operative position.

It should be noted that this form of the invention resembles that particularly illustrated in Figures 2 and 2a by the inclusion of resilient stop means which constantly operate to yieldingly maintain the blade in the normal operative or radial position. In other words, this last form of the invention also includes a resilient block 105 which is always under compression between the adjacent parts regardless of the relative positions thereof. In Figure 7 the full line showing of the hub end of the blade clearly illustrates the various parts with the blade moved or flexed on the pin 100 away from the normal or radial position. The dotted line showing 103a illustrates the position of the parts with the blade in the radial position.

The expression "normal operative position" is used herein to designate the radial blade position, but is not to be understood as indicating that the blades do not move from the "radial" during normal forward flight, for in each revolution each blade assumes various angles both forwardly and rearwardly from radial position in the plane of rotation and upwardly and downwardly with respect to the mean rotational position. It should also be understood that "blade mounting parts" includes such element or elements of, or associated with, the blade or the hub, as co-operate to mount the blade for independent displacement movements.

It will now be seen that the general arrangement of the hub, blades, pivots, brake mechanism, resilient buffers, and other associated parts is such that although free rotation of rotor and angular adjustment of the blades in flight is always assured, yet proper starting and stopping of the system, and spacing and cushioning of the blades, are attained, the control of excessive blade movements in the plane of rotation being always smooth and positive, regardless of the vertical inclination of the individual blades. Furthermore, it will be seen that the desired substantially free automatic independent adjustment of the blades, both vertically and horizontally, while in flight operation, is fully provided for, without any danger of the fixed incidence setting of the individual blades being in any way disturbed, and in general that the objects and advantages originally discussed herein, are attained by a simple and rugged construction.

What I claim is:—

1. In an aircraft, an axis structure, a plurality of sustaining blades mounted for common rotation thereabout, means permitting displacement of the blades, in the general plane of rotation, from their radial positions with respect to the axis, and stop means fixedly determining the limits of such displacement.

2. In an aircraft, an axis structure, a plurality of sustaining blades mounted for common rotation thereabout, means permitting displacement of the blades, in the general plane of rotation, from their radial positions with respect to the axis, and stop means fixedly determining the limits of such displacement and arranged to yieldingly resist displacement intermediate said limits.

3. An aircraft having a set of movable sustaining blades, a mounting structure therefor having means providing for rotation of the set of blades about a common axis, means providing for limited pivotal movement of the blades individually and independently of the common rotation thereof, and means for controlling the pivotal movement, the last mentioned means being effective, for each blade independently of others, to yieldingly control the positions of the blades with respect to the limits of their pivotal movement when the speed of rotation of the set of blades is substantially lower than flight speed but being substantially inoperative at the normal flight speed of rotation of the set of blades.

4. An aircraft including an upright standard, a member mounted for rotation on the standard, a sustaining blade secured to said member and having at least two blade mounting parts pivoted to each other, said parts having pairs of opposed surfaces on opposite sides of the pivot axis, the surfaces of said pairs being arranged for movement with the said parts toward and away from each other, and resilient means between the surfaces of said pairs.

5. An aircraft including an upright standard, a member mounted for rotation on the standard, a sustaining blade secured to said member and having at least two blade mounting parts pivoted to each other, said parts having opposed surfaces arranged for movement therewith toward and away from each other, and a resilient member between the surfaces.

6. An aircraft including an upright standard, a member mounted for rotation on the standard, a sustaining blade secured to said member and having at least two blade mounting parts pivoted to each other, said parts having opposed surfaces arranged for movement therewith toward and away from each other, and a rubber block between said surfaces.

7. An aircraft including an upright standard, a member mounted for rotation on the standard, a sustaining blade secured to said member and having at least two blade mounting parts pivoted to each other, said parts having opposed surfaces arranged for movement therewith toward and away from each other, and a resilient member reacting between said surfaces to maintain the said parts in their normal operative position relative to each other.

8. An aircraft including an upright standard, a member mounted for rotation on the standard, a sustaining blade secured to said member and having at least two blade mounting parts pivoted to each other, said parts having opposed surfaces arranged for movement therewith toward and away from each other, and a rubber block reacting between said surfaces to maintain said parts in their normal operative position relative to each other.

9. An aircraft including an upright standard, a member mounted for rotation on the standard, a sustaining blade secured to said member and having at least two blade mounting parts pivoted to each other, said parts having pairs of opposed surfaces on opposite sides of the pivot axis, the surfaces of said pairs being arranged for movement with the said parts toward and away from each other, and resilient means reacting between the surfaces of said pairs to maintain the said parts in their normal operative position relative to each other.

10. An aircraft including an upright standard, a member mounted for rotation on the standard, a sustaining blade secured to said member and having at least two blade mounting parts pivoted to each other, said parts having pairs of opposed surfaces on opposite sides of the pivot axis, the surfaces of said pairs being arranged for movement with the said parts toward and away from each other, and a single rubber block reacting between the surfaces of said pairs to maintain the said parts in their normal operative position relative to each other.

11. An aircraft having a rotatably mounted sustaining blade having two blade mounting parts pivoted to each other, pairs of opposed but spaced stop members, associated with said parts, and resilient means positioned between and contacting with the stop members of each pair and tending to yieldingly limit pivotal movement of the blade parts with respect to each other.

12. An aircraft having a rotatably mounted sustaining blade having two blade mounting parts pivoted to each other, pairs of opposed but spaced stop members, associated with said parts, and resilient means positioned between and contacting with the stop members of each pair and tending to yieldingly limit pivotal movement of the blade parts with respect to each other, together with means for braking the rotary movement of said blade.

13. An aircraft including a set of movable sustaining blades, a mounting structure therefor having means providing for rotation of the set of blades around a common axis, and means providing for pivotal movement of the blades, individually and independently of the common rotation of the set, on at least two predetermined intersecting axes, the last mentioned means including a joint device having bearings therein adapted to receive pivot pins positioned to provide said intersecting axes.

14. An aircraft including a set of movable sustaining blades, a mounting structure therefor having means providing for rotation of the set of blades around a common axis, and means providing for pivotal movement of the blades, individually and independently of the common rotation of the set, on at least two predetermined intersecting axes, the last mentioned means including a joint device having bearings therein adapted to receive pivot pins positioned to provide said intersecting axes, together with pivot pins cooperating with said bearings and means for lubricating said bearings including a lubricant distributing passage formed in one pin and a distributing passage formed in another pin and communicating with the passage first mentioned.

15. An aircraft including a set of movable sustaining blades, a mounting structure therefor having means providing for rotation of the set of blades around a common axis, and means providing for pivotal movement of the blades, individually and independently of the common rotation of the set, on at least two predetermined intersecting axes, together with means for lubricating adjacent relatively pivotable parts including a lubricant reservoir in said mounting and distributing passages extending therefrom to the said parts.

16. An aircraft including a set of movable sustaining blades, a mounting structure therefor having means providing for rotation of the set of blades around a common axis, and means providing for pivotal movement of the blades, individually and independently of the common rotation of the set, on at least two predetermined intersecting axes, the last mentioned means including a joint device having bearings therein adapted to receive pivot pins positioned to provide said intersecting axes, together with pivot pins cooperating with said bearings and means for lubricating said bearings including a reservoir in said mounting and distributing passages extending therefrom to said bearings.

17. An aircraft including a set of movable sustaining blades, a mounting structure therefor having means providing for rotation of the set of blades around a common axis, and means providing for pivotal movement of the blades, individually and independently of the common rotation of the set, on at least two predetermined intersecting axes, the last mentioned means including a joint device having bearings therein adapted to receive pivot pins positioned to provide said intersecting axes, together with pivot pins cooperating with said bearings and means for lubricating said bearings including a reservoir in said mounting and distributing passages extending therefrom to said bearings through the pivot pins.

18. An aircraft having a rotatably mounted sustaining blade having a plurality of blade mounting parts pivoted to each other on a substantially vertically disposed axis, pairs of opposed stop members carried by the pivoted mounting parts, the members of the pairs cooperating with each other to limit pivotal movement in opposite directions, and resilient means carried by a stop member of each pair for cushioning the pivotal movement near the limits thereof.

19. An aircraft having a rotatably mounted sustaining blade having a plurality of blade mounting parts pivotally secured to each other on a substantially vertically disposed axis, stop means limiting the pivotal movement, and means for cushioning the pivotal movement near the limits thereof.

20. An aircraft having a rotatably mounted sustaining blade actuable by relative air-flow having a plurality of blade mounting parts pivotally secured to each other on a substantially vertically disposed axis, stop means limiting the pivotal movement, means for cushioning the pivotal movement near the limits thereof, and means for braking the rotary movement of the said blade.

21. An aircraft having a rotatably mounted sustaining blade having a plurality of blade mounting parts pivotally secured to each other, stop means providing limits for pivotal movement but permitting substantially free pivotal movement within a range intermediate said limits, and means for cushioning the pivotal movement near the limits thereof.

22. A sustaining rotor construction for aircraft including a sustaining blade arranged for automatic force-compensating movements, in addition to its rotative movement, having associated therewith a yielding device for cushioning such compensating movements, said device including a pneumatic cushion.

23. A sustaining rotor construction for aircraft including a sustaining blade arranged for automatic force-compensating movements, in addition to its rotative movement, having associated therewith a yielding device for cushioning such compensating movements in a direction comprised within the general plane of rotation, said device including an air cell.

24. An aircraft having a rotatably mounted sustaining blade having a plurality of blade mounting parts pivoted to each other on a substantially vertically disposed axis, pairs of opposed stop members carried by the pivoted mounting parts, the members of the pairs cooperating with each other to limit pivotal movement in opposite directions, and a pneumatic device carried by a stop member of each pair for cushioning the pivotal movement near the limits thereof.

25. An aircraft having a rotatably mounted sustaining blade having a plurality of blade mounting parts pivotally secured to each other, stop means limiting the pivotal movement, and a pneumatic device for cushioning the pivotal movement near the limits thereof.

26. In combination a mounting structure for a rotatively mounted sustaining blade system having a hollow supporting member about which the blade system rotates, and means for actuating an indicator for the speed of rotation of the blade system including a driving mechanism extending through said member and operatively associated with the blade system.

27. In an aircraft having a rotatively mounted sustaining blade system, a mounting structure therefor having means providing for rotation of the system about a common axis, means providing for pivotal movement of the blades of the system, on at least two different axes, individually and independently of the common rotation, a lubricant reservoir in said structure and means for distributing lubricant from said reservoir to the said means providing for pivotal movement on said two different axes.

28. In an aircraft, the combination of forward propulsion means, a sustaining rotor including a plurality of wings or blades arranged for rotation about a common substantially vertical axis, mounting means for the blades providing for independent force compensating movements thereof during flight operation, means for controlling individual blade movements arranged to react between blades, and additional means for controlling individual blade movements arranged to react between the blades and a portion of the rotor axis structure.

29. In an aircraft, the combination of forward propulsion means, a sustaining rotor including a plurality of wings or blades arranged for rotation about a common substantially vertical axis, mounting means for the blades providing for blade movements fore and aft within their general path of rotative travel, means for controlling individual blade movements arranged to react between blades, and additional means for controlling individual blade movements arranged to react between the blades and a portion of the rotor axis structure.

30. In an aircraft, the combination of forward propulsion means, a sustaining rotor including a plurality of wings or blades arranged for rotation about a common substantially vertical axis, mounting means for the blades providing for independent force compensating movements thereof during flight operation, means for controlling individual blade movements arranged to react between blades, and additional means for controlling individual blade movements arranged to react between the blades and a portion of the rotor axis structure, the last mentioned means being operable independently as to each blade.

31. In an aircraft, the combination of forward propulsion means, a sustaining rotor including a plurality of wings or blades arranged for rotation about a common substantially vertical axis, mounting means for the blades providing for blade movements fore and aft within their general path of rotative travel, means for controlling individual blade movements including flexible blade interconnecting cables, and additional means for controlling individual blade movements including a yielding cushioning device arranged to react between the blades and a portion of the rotor axis structure.

32. In an aircraft sustaining rotor construction, an axis mechanism and a joint structure joining a sustaining blade thereto, said joint structure including a pivot pin and a cooperating pivot part, the pin having means for delivering lubricant to a bearing surface between said part and the said pin in the high pressure area incident to the action of centrifugal force during rotation of the rotor.

33. In an aircraft sustaining rotor construction, an axis mechanism and a joint structure joining a sustaining blade thereto, said joint structure including a pivot pin and a cooperating pivot part, the pin being at least partially hollow to receive lubricant and having lubricant delivery means formed therein to deliver lubricant from the interior thereof to a bearing surface between said part and the said pin in the high pressure area incident to the action of centrifugal force during rotation of the rotor.

34. In an aircraft sustaining rotor construction, an axis mechanism and a joint structure joining a sustaining blade thereto, said joint structure including a pivot pin and a cooperating pivot part, the pin being at least partially hollow to receive a supply of lubricant and having means for delivering lubricant to a bearing surface under the influence of centrifugal force during rotation of the rotor.

35. In a rotor blade mounting, an axis structure, a blade spar, and means for attaching the spar to the axis structure, said means including a member arranged for pivotal attachment to the axis structure, and an additional attachment part having a cylindrical portion fitting into the blade spar and a flanged portion arranged for cooperation with said member, together with means for securing the said cylindrical portion to the spar and the said flanged portion to the said member.

36. In an aircraft, forward propulsion means, a system of rotative sustaining blades or wings constituting the primary means of sustension for the craft, said system including a hub structure and a plurality of wings of aeroform shape pivotally joined with the hub structure and mounted for normally free rotation under the influence of relative air-flow as induced by the forward propulsion means, in which construction the wings swing on their pivots under the influence of variations in inertia, centrifugal, lift and other forces encountered in flight operation, and means operative as to each blade substantially independently of the others for controlling such pivotal swinging movements.

37. In an aircraft, forward propulsion means, a system of rotative sustaining blades or wings constituting the primary means of sustension for the craft, said system including a hub structure and a plurality of wings of aeroform shape pivotally joined with the hub structure and mounted for normally free rotation under the influence of relative air-flow as induced by the forward propulsion means, in which construction the wings swing on their pivots under the influence of variations in inertia, centrifugal, lift and other forces encountered in flight operation, means for initiating rotation of the rotor system prior to take-off from the ground, and means for controlling blade swinging movements set up by initiation of rotation of the rotor.

38. In an aircraft, forward propulsion means for effecting translational flight, a rotor of rotative sustaining blade or wing means constituting the primary means of sustension for the craft, said rotor including a hub structure and a plurality of wings of aeroform shape pivotally connected with the hub structure for rotation therewith and mounted for normally free actuation under the influence of relative air-flow as induced, for example, by the forward propulsion means in effecting translational flight, in which construction the wings swing on their pivots under the influence of flight forces, means deriving its power or energy from the forward propulsion means for initiating rotation of the rotor prior to take-off from the ground, said means being arranged to permit free overrunning of the rotor under the influence of relative air-flow, and means for controlling wing swinging movements set up by initiation of rotation of the rotor.

39. In an aircraft, forward propulsion means, a sustaining rotor constituting the primary means of sustension for the craft, the rotor including a normally freely rotative central hub structure and a plurality of blades or wings articulated to the hub structure with freedom for pivotal movement thereof fore and aft in their general rotative path of travel, the wings further being so mounted as to provide for autorotation or air actuation thereof under the influence of relative air-flow as induced, for example, by the forward propulsion means, in which construction the blades or wings swing fore and aft on their pivot axes under the influence of variations in inertia, centrifugal, lift and other forces incident to flight operation, and a device for each wing, operative substantially independently of the other wings, for controlling the swinging movements thereof.

40. In an aircraft, forward propulsion means, a system of rotative sustaining blades or wings constituting the primary means of sustension for the craft, said system including a hub structure and a plurality of wings of aeroform shape pivotally joined with the hub structure and mounted for normally free rotation under the influence of relative air-flow as induced by the forward propulsion means, in which construction the wings swing on their pivots under the influence of variations in inertia, centrifugal, lift and other forces encountered in flight operation, means for braking rotary movement of the sustaining system, and means for controlling swinging movements of the wings resulting from application of a braking force.

41. An aircraft including forward propulsion means, and a sustaining rotor constituting the primary means of sustension, said rotor comprising a central hub structure mounted for free rotation on a generally upright axis and a plurality of sustaining wings extended radially from the hub structure and pivotally secured thereto on generally upright axes whereby to permit swinging movements of the wings generally fore and aft in their rotative path of travel, a brake mechanism associated with the hub structure of the rotor, and means for controlling fore and aft swinging movements of the wings under the influence of the application of a braking force.

42. In an aircraft, forward propulsion means, a rotor system constituting the primary means of sustension for the craft and including a normally freely rotative hub structure and a plurality of wings extended radially outwardly from the hub structure and articulated thereto with freedom for individual swinging movements under the influence of varying flight forces fore and aft as well as generally transversely of the rotative path of travel thereof, the said wings further being mounted to provide for autorotation or air actuation thereof under the influence of relative air-flow as induced, for example, by said forward propulsion means, a mechanism for initiating rotation of the rotor prior to take-off from the ground, means for supporting the wings in their extended positions as against excessive downward swinging movement, and means for controlling swinging movements of the wings fore and aft in their general path of rotative travel, whereby even during initiation of rotation of the rotor, excessive displacement of the wings from their radial positions about the hub structure is prevented.

43. In an aircraft, a combination of forward propulsion means, a rotor having a central hub structure and radially extended rotative sustaining wings positioned for normally free rotation under the influence of relative air-flow in flight, a mechanism for initiating rotation of the rotor prior to take-off from the ground, means providing for wing displacement movements generally fore and aft in their rotative path of travel whereby to compensate for variations in flight forces and to make accommodation for forces resulting from initiation of rotation of the rotor, and means for controlling wing displacement movements whereby to avoid excessive displacement movements in accommodating for forces resulting from initiation of rotation.

44. In an aircraft, a combination of forward propulsion means, a rotor having a central hub structure and radially extended rotative sustaining wings positioned for normally free rotation under the influence of relative air-flow in flight, a mechanism for braking rotation of the rotor, means providing for wing displacement movements generally fore and aft in their rotative path of travel whereby to compensate for variations in flight forces and to make accommodation for forces resulting from the application of a braking effort, and means for controlling wing displacement movements whereby to avoid excessive displacement movements in accommodating for forces resulting from the application of a braking effort.

45. In an aircraft of the character described, a fuselage, a rotor constituting the primary means of sustension for the craft and having a plurality of blades arranged for air actuation, a rotor mounting pylon including a plurality of separate leg elements converging upwardly from the fuselage, an apex structure adapted to join the free or upper ends of the several leg elements, the apex structure including a member having means formed integrally therewith for cooperation with the said leg elements in joining their free or upper ends and further having a spindle part formed integrally therewith by walls converging upwardly from said means, and a rotor hub structure for mounting the rotor on said spindle part including a hub member surrounding the spindle and a thrust bearing interposed between the hub member and the spindle, whereby the thrust of sustension of the rotor during flight operation is substantially directly transmitted from said spindle part to said leg elements.

46. In a rotary wing system for aircraft, an upright rotatable axis mechanism, wing means mounted thereon for normal actuation by relative air-flow, means providing for swinging movement of the wing means fore-and-aft in the general rotative path under the action of air-flow and other forces in flight, and means for controlling such swinging movement mounted in large part adjacent the axis of the wing means whereby interference with normal air-actuation of the wing means is minimized.

47. In an aircraft having a sustaining rotor, an axis structure, a sustaining blade pivoted thereto, and pivot joint parts including a pair of pivot pins and a block apertured to receive said pins, said pins being hollowed to provide lubricant reservoirs and having means of intercommunication between the said reservoirs.

JUAN DE LA CIERVA.